US005371768A

United States Patent [19]

Matzner

[11] Patent Number: 5,371,768

[45] Date of Patent: Dec. 6, 1994

[54] SWIRL TYPE SPACER FOR BOILING WATER REACTOR FUEL

[75] Inventor: Bruce Matzner, San Jose, Calif.

[73] Assignee: General Electric Company, San Jose, Calif.

[21] Appl. No.: 989,661

[22] Filed: Dec. 14, 1992

[51] Int. Cl.[5] .......... G21C 3/34

[52] U.S. Cl. .......... 376/439; 376/443

[58] Field of Search .......... 376/438, 439, 443, 444; 976/DIG. 81, DIG. 80, DIG. 73

[56] References Cited

U.S. PATENT DOCUMENTS

| | | | |
|---|---|---|---|
| 3,344,855 | 10/1967 | Clark | 376/439 |
| 3,749,640 | 7/1973 | Israel | 376/439 |
| 3,809,609 | 5/1974 | Krawiec et al. | 376/439 |
| 3,886,038 | 5/1975 | Raven | 376/439 |
| 4,571,324 | 2/1986 | Johansson et al. | 376/441 |
| 4,587,704 | 5/1989 | Matzner et al. | 29/446 |
| 4,725,403 | 2/1988 | Buettiker | 376/439 |
| 5,032,351 | 7/1991 | Johansson | 376/438 |
| 5,069,864 | 12/1991 | Johansson et al. | 376/441 |
| 5,186,891 | 2/1993 | Johansson et al. | 376/438 |
| 5,229,068 | 7/1993 | Johansson et al. | 376/371 |
| 5,317,613 | 5/1994 | Fennern | 376/439 |

FOREIGN PATENT DOCUMENTS

| | | |
|---|---|---|
| 0514116 | 11/1992 | European Pat. Off. . |
| 0514117 | 11/1992 | European Pat. Off. . |
| 0514120 | 11/1992 | European Pat. Off. . |
| 1564219 | 2/1970 | Germany . |
| 4013397 | 10/1990 | Germany . |

*Primary Examiner*—Donald P. Walsh
*Assistant Examiner*—Meena Chelliah
*Attorney, Agent, or Firm*—J. S. Beulick

[57] ABSTRACT

In a boiling water nuclear reactor fuel bundle, the use of a shortened ferrule spacer in combination with overlying swirl vanes is set forth. In the preferred embodiment, the shortened ferrule spacer is placed under any swirl vanes and has an individual ferrule surrounding each fuel rod at the elevation of the spacer. Each ferrule is given both minimum side wall thickness in the range of 0.020 inches or less as well as reduced height in the order of 0.9 inch or less. The reduced height and thickness of the ferrule spacer is required to maintain pressure drop within acceptable limits and still tends to augment the required liquid film for steam generation over the fuel rod lengths downstream (that is immediately above) the spacer. At the same time, the swirl vane structure is placed immediately above the ferrule spacer overlying the so-called subchannel region of the ferrule spacer between the fuel rods.

11 Claims, 4 Drawing Sheets 3D 3C $R_3$ R V 3C 3D $R_2$ $R_1$ $W_1$ $W_2$ $R_3$ F $S_2$ OR $S_3$

SWIRL TYPE SPACER FOR BOILING WATER REACTOR FUEL

This invention relates to spacers for use within a boiling water reactor. Specifically, a shortened ferrule type spacer is combined with preferably overlying swirl vanes in the upper two phase region of a fuel bundle to provide improved critical power performance with reduced overall pressure drop.

BACKGROUND OF THE INVENTION

Fuel bundles for boiling water reactors are known. They include a plurality of upstanding parallel fuel rods supported on a lower tie plate with at least some of the fuel rods extending to and fastened to an upper tie plate. A fuel bundle channel surrounds the fuel rods at the lower tie plate and extends to the region of the upper tie plate. In operation, water flows into the fuel bundle through the lower tie plate and flows upward of the fuel bundle in a confined flow path within the channel generating steam. Water and steam exit the fuel bundle from the upper tie plate.

The fuel rods are long, slender and flexible. In the dynamics of steam generation, these rods would undergo vibration and come into abrading contact one with another. Consequently, so-called fuel bundle spacers are utilized. These spacers surround each fuel rod at spaced apart vertical locations along the length of the fuel bundles and essentially maintain the fuel rods in their designed side-by-side relation interior of the fuel bundle channel.

As pertinent to this disclosure, the use of so-called ferrule spacers in the upper two phase region of the fuel bundle is utilized. The ferrules in ferrule spacers constitute discrete cylinders having typically paired stops on one side of the ferrules and fuel rod biasing springs on the other side of the ferrules. The inside diameter of the ferrules exceeds the outside diameter of the fuel rods so that the fuel rod when biased by the spring is centered with respect to the ferrule. When the ferrules are held together in a matrix, a rigid and highly satisfactory spacing of the fuel rods results.

It has been discovered that ferrule spacers in combination with fuel rods in the upper two phase region of a fuel bundle have a beneficial effect on critical power performance. Such spacers tend to augment the required liquid film on the surface of the steam generating fuel rods. The maintenance of a liquid film coating prevents a condition known as "dryout" on the surfaces of the fuel rods. The onset of dryout occurs at the first location where the liquid film on any fuel rod is completely evaporated, i.e., the film thickness equals zero. This phenomenon will occur just upstream of a spacer before the liquid film thickness is augmented by passing through the spacer. (Therefore, the performance of spacers 2 and 3 thicken the liquid films that might experience dryout just upstream of spacers 1 and 2, respectively. Such a condition can lead to overheating of the cladding with resultant damage to the fuel rods. Unfortunately, all spacers to some extent create pressure drop. Pressure drop in the upper two phase region of the fuel bundle is preferably to be avoided as such pressure drop contributes to both thermal hydraulic and nuclear thermal hydraulic instabilities.

Swirl vanes may be used in combination with boiling water reactors in the upper two phase region of fuel bundles in such reactors. As relevant to this disclosure, at least the following three disclosures should be considered.

Swirl vanes were first proposed in combination with a boiling water reactor fuel rods not confined to fuel bundles. These swirl vanes were the same length as the fuel rods and placed interstitially of the fuel rods. As both the modern expedient of fuel bundles was omitted and pressure drop was high, these designs had no commercial significance.

A spacer made entirely of swirl vanes is disclosed in Johansson U.S. patent application Ser. No. 07/702,212 filed May 17, 1991 (now issued U.S. Pat. No. 5,186,891 issued Feb. 16, 1993), entitled SWIRL VANES AND INCONEL SPACER. In this design, swirl vanes are co-extensive with the height of the spacer and occupy each and every spatial interval between fuel rods. As a consequence, high pressure drop is experience in such a spacer.

PREVIOUS RELATED DISCLOSURES NOT PRIOR ART

Swirl vanes overlying part length rods have been disclosed in Dix patent application Ser. No. 07/702,644 filed May 17 1991, entitled SEPARATION DEVICES WITH PART LENGTH RODS, (now abandoned in favor of continuation-in-part application of Johansson et al., Ser. No. 07/914,389 filed Jul. 15, 1992 entitled OPTIMIZED CRITICAL POWER IN A FUEL BUNDLE WITH PART LENGTH RODS). In this disclosure, the swirl vane is relied upon as both a steam separation device overlying the part length fuel rod as well as a device to improve critical power. The idea is that by separating water and steam in the volume overlying the part length fuel rods, improved venting of the fuel bundle can occur. Further, it has been discovered that swirl vanes in the upper two phase region of the fuel bundle below the first space can improve critical power.

It is to be noted that with this concept, the swirl vane obstructs the normal vertical removal of the fuel rod. This being the case, this design has not seen commercial usage for at least this reason.

SUMMARY OF THE INVENTION

In a boiling water nuclear reactor fuel bundle, the use of a shortened ferrule spacer in combination with overlying swirl vanes is set forth. In the preferred embodiment, the shortened ferrule spacer is placed under any swirl vanes and has an individual ferrule surrounding each fuel rod at the elevation of the spacer. Each ferrule is given both minimum wall thickness in the range of 0.020 inches or less as well as reduced height in the order of 0.9 inch or less. The reduced height and thickness of the ferrule spacer is required to maintain pressure drop within acceptable limits and still tends to augment the required liquid film for steam generation over the fuel rod lengths downstream (that is immediately above) the spacer. At the same time, the swirl vane structure is placed immediately above the ferrule spacer overlying the so-called subchannel region of the ferrule spacer between the fuel rods.

The swirl vane placed above the ferrule spacer tends to redistribute water entrained in the subchannel region between the fuel rods to the fuel rods. The objective of this design is to obtain equivalent critical power performance to previously proposed designs while concurrently obtaining a design with minimum possible pressure drop. This is achieved in two new ways. First, the swirl structure is placed above the ferrule structure so that the severe constriction of fluid flow area that would have occurred if the swirl vanes were placed inside the existing ferrule structure has been avoided. Second, these modified spacers with swirl vanes added have only been added at locations where they will contribute to improving critical power performance, typically at the second, third and very infrequently at lower spacer locations from the top of the bundle.

DESCRIPTION OF THE PREFERRED EMBODIMENT

Figure 1:
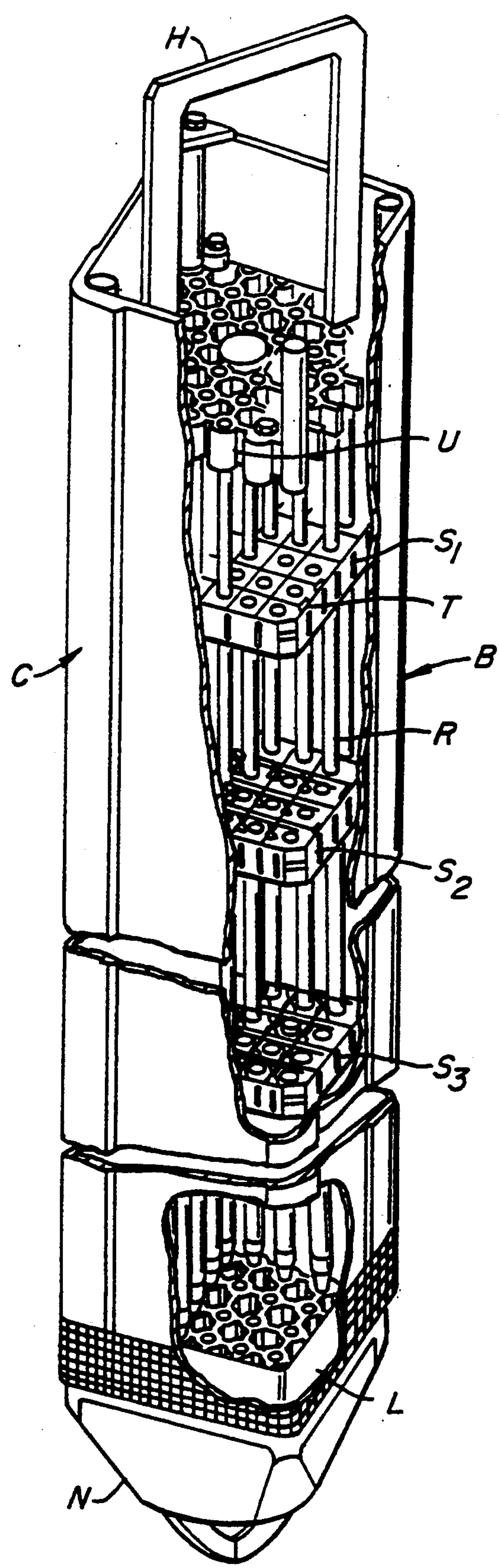
FIG. 1 is a side elevation perspective of a fuel bundle with the majority of the length of the fuel bundle omitted illustrating a fuel bundle and the top three spacers including the second and third spacer which are most pertinent to this invention.

Referring to FIG. 1, a typical fuel bundle B having the spacer of this invention is illustrated. The fuel bundle includes lower tie plate L having nose piece N. A plurality of full length fuel rods R extend from lower tie plate L to upper tie plate U. In the usual embodiment, one or more of the fuel rods R is a part length fuel rod $R_p$. These fuel bundles are surrounded by a channel C extending from lower tie plate L at least to the vicinity of upper tie plate U. As is known in the prior art, the bands of the spacers can include flow tabs T. (See FIGS. 1 and 2).

The reader will understand that the fuel bundle B is shown only for a portion of its length. Specifically, the fuel bundle is sectioned at surrounding channel C so that the spacers $S_1$, $S_2$, and $S_3$ can be seen. The reader will understand that the invention here is especially applicable to spacers $S_2$ and $S_3$.

Figure 2:
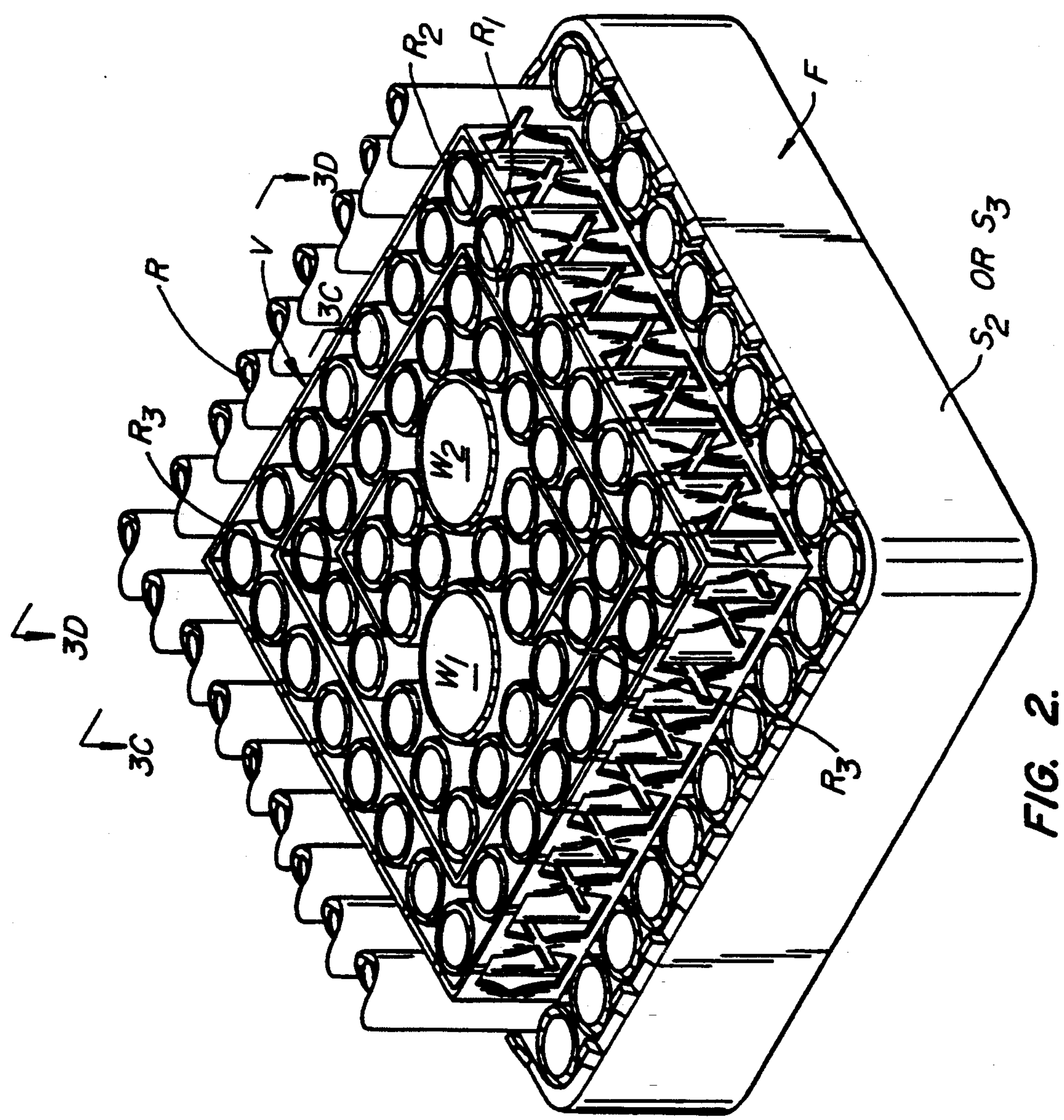
FIG. 2 is a perspective side elevation illustrating a ferrule spacer of shortened height having overlying swirl vanes some of the swirl vanes being shown in perspective with the remainder of the swirl vanes one being schematically shown by having their intended path of placement traced overlying the shortened vertical height spacer; and, FIG. 3A is a side elevation of the spacer of FIG. 2 illustrating only one row of fuel rods and one row of swirl vanes in the spacer of this invention to set forth the respective flow paths around the structure of the spacer for producing maximum critical power with low pressure drop.

Referring to the perspective view of FIG. 2, the construction of a spacer $S_2$ and $S_3$ without the placement of the fuel rods within the spacer is illustrated. The spacer is a two level spacer including preferably lower ferrule layer F and upper swirl vane layer V.

Lower ferrule layer F includes conventional side-by-side ferrules 14 having shortened height and annular walls of minimum thickness. Normally, such ferrule spacers have heights in the order of 1.2 inches. The preferred spacer of this invention has a preferred height in the order of one-half to three-quarters of the normal value. That is to say, the ferrule height is held to a limit of 0.9 inch or less.

A similar modification has been made to the thickness of the spacer. Normally, ferrule spacers have wall thickness in the order of 0.020 inches. In the construction here utilized, the wall thickness of the material of the ferrule is reduced below 0.020 inches—preferably in the range of 0.015 inches. These reductions in material dimensions are required for designs which normally have a high inherent bundle pressure drop.

Figure 3A:
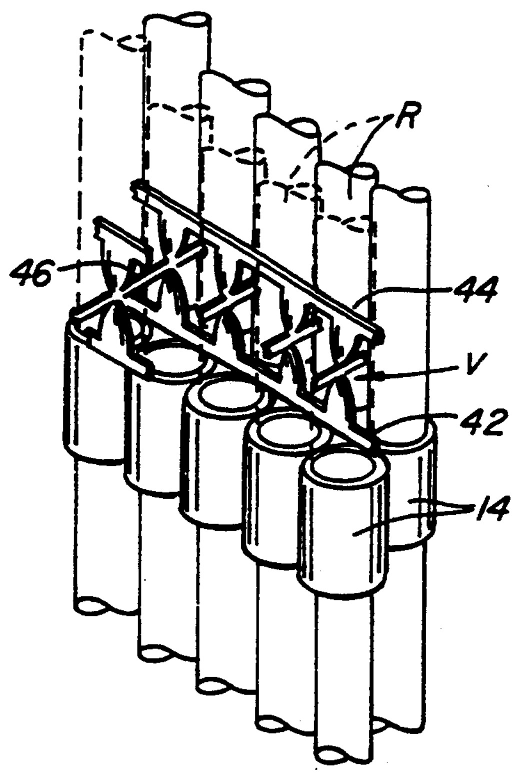
FIG. 3B is a plan view overlying the spacer of FIG. 2.
FIG. 3C is a plan view overlying the spacer of FIG. 2 showing the profile of only the swirl vanes normal to arrows 3C—3C.
FIG. 3D is a plan view overlying the spacer of FIG. 2 showing the profile of only the ferrule portion of the spacer normal to arrows 3D—3D.
Figure 3B:
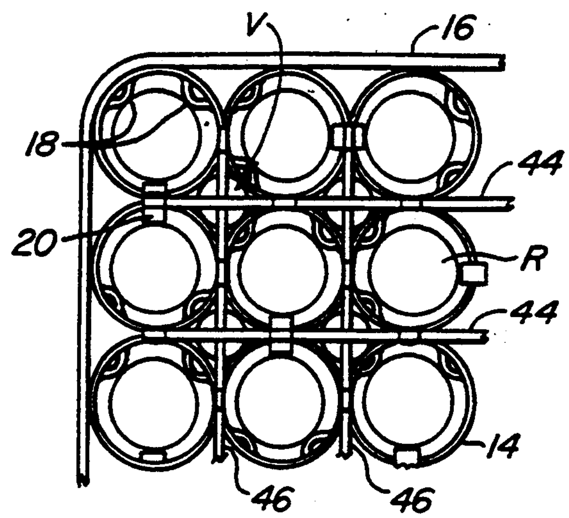
Figure 3C:
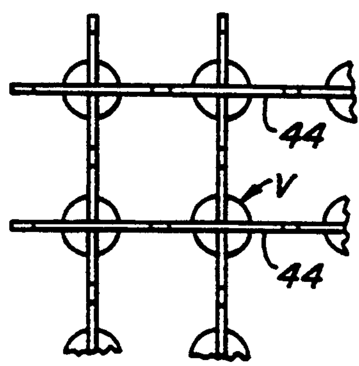

The remainder of the construction of the ferrule layer F is conventional. The spacer is surrounded by band 16 and includes stops 18 and loop springs 20 interior of the ferrules (See FIG. 3B).

Figure 4A:
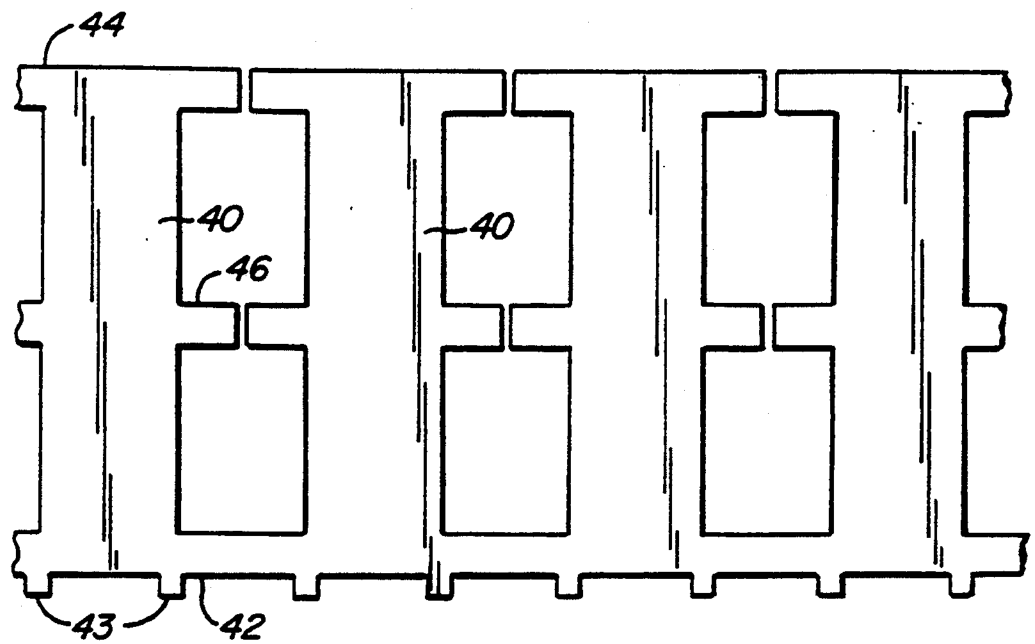
FIG. 4A is an illustration of the ferrule layer of the spacer before necessary 180° twisting of the swirl vanes; and, FIG. 4B is an illustration of the ferrule layer after the necessary 180° twisting of the swirl vanes.
Figure 4B:
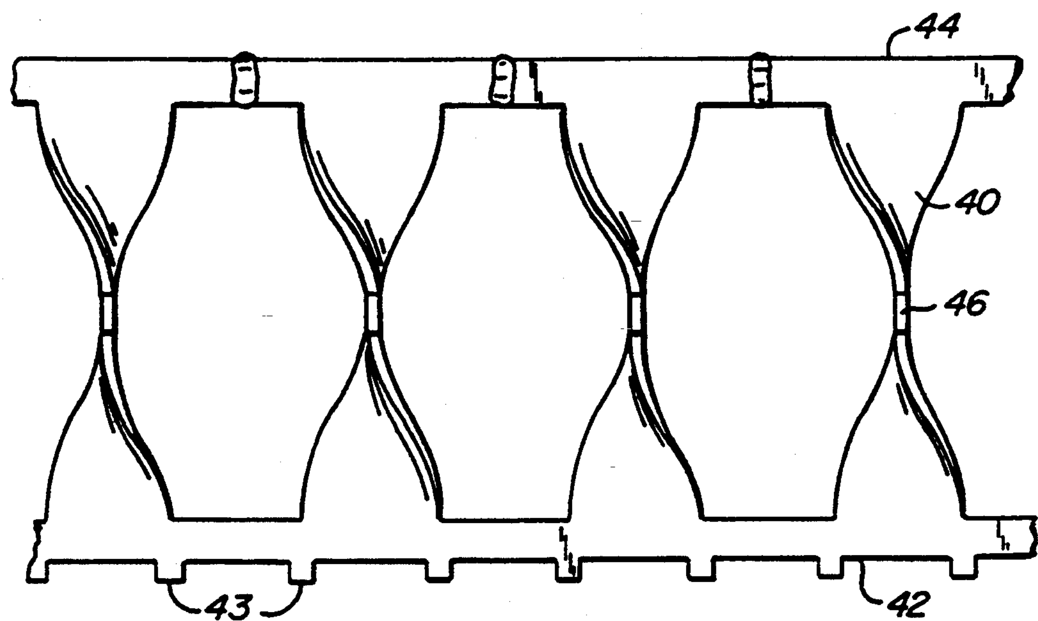

Vane portion V is just as easily understood. Referring to FIG. 4A, a material which is preferably Zircalloy is shown with generally "I" shaped upstanding metal cut out sections connected at the bottom by continuous band 42. At the top, sections 40 have an interrupted band 44. Centrally of the generally "I" shaped bands are central tabs 46.

Figure 3D:
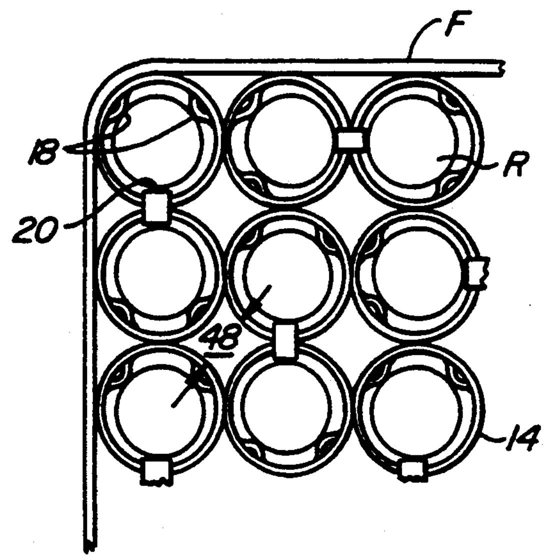

The width of sections 40 is generally the minimum width of the subchannel region 48 formed between adjacent ferrules 14 (See FIG. 3D). This minimum width is utilized so that when the respective members 40 are twisted, the resulting twisted structure only overlies the subchannel region at 48.

Continuous arm 42 includes tabs 43. Tabs 43 are spaced for keying to the tops of the assembled ferrules 14. These tabs 43 may conveniently serve as points of attachment.

Preferably, vanes 30 include at least 90° twists from top to bottom. As here shown, the channels include the illustrated 180° twists. Such twisting enables arms 44 to form a grid parallel to continuous arm 42 at the bottom with arms 46 being joined at 90° to form a continuous interval. Preferably continuous arm 42 is fastened to the top of ferrule array F.

Returning to FIG. 2, the paths along which the swirl vanes V are attached is shown. Preferably, a row $R_1$ of vanes V is placed between the first and second rows of fuel rods. Likewise, a row $R_2$ of vanes V is placed between the second and third row of fuel rods.

It will be observed that the matrix illustrated is a 10 by 10 array of fuel rods having water rods $W_1$ and $W_2$ each displacing four fuel rods from the matrix. In this event, partial rows $R_3$ of swirl vanes V can be used between the fuel rods of the third and fourth rows.

Having set forth the construction of spacers $S_2$ and $S_3$, the operation of the spacer can now be set forth.

It will be understood that when a reactor operates under normal power loads—in excess of 80% of available power—the upper two phase region of bundle B constitutes a region where rods R must be provided with a desired liquid film coating for the generation of steam. This will be the region where spacers $S_2$ and $S_3$ will be located.

It will further be understood, that spacer $S_1$ is not a candidate for this spacer construction. Simply stated, nuclear loading of fuel rods R is designed so that at the top end of the active fuel region, fuel rods R do not have the heat output that threatens the "dryout" conditions on the surfaces of the fuel rod cladding.

It has been set forth that the spacer construction of spacers $S_2$ and $S_3$ has minimized the pressure drop effect of adding swirl vanes to an existing spacer design. This minimized pressure drop is at least due to not decreasing the flow area through the axial length of the spacer. Therefore, the more mobile, lower density steam will tend to avoid the region in favor of the higher density, less mobile liquid water.

Regarding ferrule layer F, it will be understood that the interstitial volume between each ferrule 14 and each fuel rod R is an area of relatively high flow resistance. Regarding the vane layer V, it will be understood that the high velocity flow exiting from the subchannels between the spacer ferrules will immediately impact upon the swirl vanes. There the liquid (being the higher density fluid component) will be centrifugally thrust toward the surrounding fuel rods while vapor will continue relatively unobstructed through the vane region. At the same time, the subchannel region 48 between ferrules 14 will define a flow path of relatively low resistance. Thus, steam vapor passing the level of ferrule layer F can in large measure be bypassed to flow in subchannel region 48.

It will be understood that it is preferred to place vane layer V overlying ferrule layer F. There is a reason for this order. Specifically, it is the function of swirl vanes 40 to permit steam to rise directly upwardly along vanes 40. At the same time, water particles will be centrifugally impelled from vanes 40 to surrounding fuel rods.

Presuming vane layer V was below ferrule layer F, such impelling of water to and toward fuel rods R would cause water to contact directly the ferrules 14 and not the rods R. This does not appear to be as desirable as permitting impelled water to impact otherwise unobstructed fuel rods R—as where vane layer V overlies ferrule layer F.

What is claimed is:

1. In a nuclear fuel bundle for a boiling water reactor comprising in combination:

- a plurality of upstanding, parallel fuel rods;
- a lower tie plate supporting said fuel rods and permitting the entrance of water moderator for the generation of steam;
- an upper tie plate for securement to at least some of said fuel rods and permitting the outflow of water and steam moderator;
- a channel surrounding said fuel rods from said lower tie plate to at least the vicinity of said upper tie plate for confining a fluid flow path from said lower tie plate to the vicinity of said upper tie plate; and
- a plurality of spacers at spaced apart vertical locations extending between said tie plates;
- the improvement to said spacers below said upper tie plate including a spacer comprising:
- a ferrule array at each said spacer with each said spacer having a vertical height no greater than 0.9 of an inch, each ferrule having a generally annular wall and a wall thickness no greater than 0.020 inches; and
- a swirl vane layer overlying subchannel regions between said ferrules and fuel rods for separating water from steam in said region overlying said subchannels and centrifugally impelling water from said subchannel regions upon said fuel rods above said ferrule spacer onto said fuel rods, said swirler vane layer overlying the subchannel regions comprising swirler vanes twisted substantially a complete 180° to overlie substantially the entirety of the subchannel regions, respectively, between the underlying ferrules and fuel rods.

2. The invention of claim 1 and wherein said improvement to at least some of said spacers includes:

- an improved spacer at second and third spaced locations below said upper tie plate.

3. The invention of claim 1 and wherein said improvement to at least some of said spacers includes:

- placing said swirl vanes at less than all of said subchannel region overlying said ferrule spacer.

4. The invention of claim 1 and wherein said improvement to at least some of said spacers includes:

- placing said swirl vanes immediate overlying said ferrules in the subchannel region of said ferrule spacer.

5. The invention of claim 2 and wherein said improved spacer is added at the fourth location below said upper tie plate.

6. A spacer according to claim 1 wherein said wall thickness is about 0.015 inches.

7. A spacer according to claim 1 wherein substantially the entirety of the projected flow areas through said spacer and between said ferrules and fuel rods being blocked by the twisted vanes.

8. A spacer according to claim 1 wherein said swirl vane layer is comprised of a plurality of continuous bands of metal arranged between adjacent rows of fuel rods with each band having a plurality of generally I-shaped sections with central tabs projecting laterally and lying in a common plane with the I-shaped sections, the I-shaped sections being twisted 180° from top to bottom such that top and bottom portions of the I-shaped sections lie in the common plane and the tabs project substantially perpendicular of said plane, and means for securing the projecting tabs of one band row and the projecting tabs of an adjacent band row to one another.

9. A spacer according to claim 8 wherein one of the upper and lower portions of each I-shaped section is a one-piece unitary construction with adjacent I-shaped sections, and means for connecting another of the upper and lower portion of each I-shaped section to next-adjacent I-shaped sections subsequent to twisting thereof.

10. A spacer according to claim 8 wherein said wall thickness is about 0.015 inches.

11. A spacer according to claim 1 wherein said improvement to at least some of said spacers includes:

- an improved spacer at second and third spacer locations below said upper tie plate;
- said swirl vanes being located at less than all of said subchannel regions overlying said ferrule spacer;
- said fuel rods being arranged in a matrix of rows and columns, said swirl vanes lying between interior rows and columns of said fuel rods relative to outermost rows and columns of said fuel rods in said bundle whereby improved critical power performance is obtained among interior fuel rods of the bundle.

* * * * *